(12) United States Patent
Spencer et al.

(10) Patent No.: US 10,164,974 B2
(45) Date of Patent: Dec. 25, 2018

(54) AUTHENTICATION SYSTEM

(71) Applicant: Traitware, Inc., Nevada City, CA (US)

(72) Inventors: Herbert W. Spencer, Grass Valley, CA (US); Christopher M. Canfield, Santa Clarita, CA (US); Harlan Hutson, San Rafael, CA (US); Vince Conroy, Novato, CA (US); Steven A. Hickerson, Visalia, CA (US)

(73) Assignee: TRAITWARE, INC., Nevada City, CA (US)

( * ) Notice: Subject to any disclaimer, the term of this patent is extended or adjusted under 35 U.S.C. 154(b) by 216 days.

(21) Appl. No.: 14/778,131

(22) PCT Filed: Mar. 19, 2014

(86) PCT No.: PCT/US2014/031247
§ 371 (c)(1),
(2) Date: Sep. 18, 2015

(87) PCT Pub. No.: WO2014/153420
PCT Pub. Date: Sep. 25, 2014

(65) Prior Publication Data
US 2016/0065570 A1 Mar. 3, 2016

Related U.S. Application Data (60) Provisional application No. 61/803,319, filed on Mar. 19, 2013, provisional application No. 61/821,176, filed on May 8, 2013.

(51) Int. Cl.
*H04L 29/00* (2006.01)
*H04L 29/06* (2006.01)
(Continued)

(52) U.S. Cl.
CPC ......... *H04L 63/0861* (2013.01); *G06Q 20/40* (2013.01); *G06Q 20/40145* (2013.01); *G06Q 30/06* (2013.01)

(58) Field of Classification Search
CPC ................ H04L 63/0861; G06Q 20/40; G06Q 20/40145; G06Q 30/06
See application file for complete search history.

(56) References Cited

U.S. PATENT DOCUMENTS 4,264,782 A 4/1981 Konheim
5,708,422 A 1/1998 Blonder
(Continued)

OTHER PUBLICATIONS

Saxena, Ashutosh MMPS: A Versatile Mobile-to-Mobile Payment System 2005 p. 1-6 IEEE Computer Society.
(Continued)

*Primary Examiner* — Jeffrey C Pwu
*Assistant Examiner* — Helai Salehi
(74) *Attorney, Agent, or Firm* — Buchalter PC; Kari L. Barnes (57) ABSTRACT

A method for authenticating a user for performing a transaction comprises receiving unique knowledge of the user such as photoauthentication, and receiving a hardware profile associated with the user. The unique knowledge and the hardware profile are compared against previously stored data representing unique knowledge of the user and a hardware profile associated with the user. If both the received data representing the unique knowledge of the user and the received hardware profile are authenticated, the transaction is allowed to go forward.

24 Claims, 6 Drawing Sheets

(51) Int. Cl.
*G06Q 30/06* (2012.01)
*G06Q 20/40* (2012.01)

(56) References Cited

U.S. PATENT DOCUMENTS

| | | | |
|---|---|---|---|
| 5,903,830 A | 5/1999 | Joao | |
| 6,078,908 A | 6/2000 | Schmitz | |
| 6,601,759 B2 | 8/2003 | Fife | |
| 6,986,039 B1 | 1/2006 | Leah | |
| 7,158,776 B1 | 1/2007 | Estes | |
| 7,197,541 B1 | 3/2007 | Skinner | |
| 7,331,518 B2 | 2/2008 | Rable | |
| 7,447,494 B2 | 11/2008 | Law | |
| 7,480,637 B2 | 1/2009 | Kolzay | |
| 7,493,497 B1 | 2/2009 | Tan, Jr. | |
| 7,496,765 B2 | 2/2009 | Sengoku | |
| 7,502,761 B2 | 3/2009 | Siegal | |
| 7,512,567 B2 | 3/2009 | Bemmel | |
| 7,566,002 B2 | 7/2009 | Love | |
| 7,673,149 B2 | 3/2010 | Ritter | |
| 7,685,629 B1 | 3/2010 | White | |
| 7,690,032 B1 | 3/2010 | Peirce | |
| 7,697,920 B1 | 4/2010 | McClain | |
| 7,793,109 B2 | 9/2010 | Ortiz | |
| 7,805,615 B2 | 9/2010 | Narendra | |
| 7,849,501 B2 | 12/2010 | Vishik | |
| 7,865,937 B1 | 1/2011 | White | |
| 7,877,611 B2 | 1/2011 | Camacho | |
| 7,904,360 B2 | 3/2011 | Evans | |
| 7,921,297 B2 | 4/2011 | Ortiz | |
| 7,953,976 B2 | 5/2011 | Giles | |
| 7,971,782 B1 | 7/2011 | Shams | |
| 7,975,150 B1 | 7/2011 | Lillibridge | |
| 7,979,054 B2 | 7/2011 | Baysinger | |
| 8,056,122 B2 | 11/2011 | Cho | |
| 8,078,885 B2 | 12/2011 | Jobmann | |
| 8,090,944 B2 | 1/2012 | Lee | |
| 8,116,731 B2 | 2/2012 | Buhrmann | |
| 8,122,004 B2 | 2/2012 | Hedge | |
| 8,136,724 B1* | 3/2012 | Aidasani | G06Q 20/4012 235/379 |
| 8,150,108 B2 | 4/2012 | Miller | |
| 8,261,089 B2 | 9/2012 | Cobos | |
| 2001/0034717 A1 | 10/2001 | Whitworth | |
| 2002/0010857 A1 | 1/2002 | Karthik | |
| 2004/0010721 A1* | 1/2004 | Kirovski | G06F 21/36 713/183 |
| 2005/0097320 A1* | 5/2005 | Golan | G06F 21/40 713/166 |
| 2005/0165700 A1 | 7/2005 | Karthik | |
| 2006/0112275 A1 | 5/2006 | Jeal | |
| 2006/0212407 A1* | 9/2006 | Lyon | G06Q 20/04 705/71 |
| 2007/0079137 A1 | 4/2007 | Tu | |
| 2007/0150299 A1* | 6/2007 | Flory | G06Q 10/10 705/51 |
| 2008/0120698 A1 | 5/2008 | Ramia | |
| 2008/0235731 A1 | 5/2008 | Bryant | |
| 2009/0076966 A1 | 3/2009 | Bishop | |
| 2009/0177587 A1 | 7/2009 | Siegal | |
| 2009/0204457 A1 | 8/2009 | Buhrmann | |
| 2009/0241175 A1 | 9/2009 | Trandal | |
| 2010/0070405 A1 | 3/2010 | Joa | |
| 2010/0088749 A1 | 4/2010 | Steeples | |
| 2010/0107092 A1 | 4/2010 | Kindberg | |
| 2010/0131414 A1 | 5/2010 | Tame | |
| 2010/0293601 A1 | 11/2010 | Schultz | |
| 2011/0067116 A1 | 3/2011 | Lu | |
| 2011/0087888 A1* | 4/2011 | Rennie | G06F 21/41 713/182 |
| 2011/0138176 A1 | 6/2011 | Mansour | |
| 2011/0142234 A1 | 6/2011 | Rogers | |
| 2011/0143711 A1 | 6/2011 | Hirson | |
| 2011/0185181 A1 | 7/2011 | Lin | |
| 2011/0185407 A1 | 7/2011 | Perrot | |
| 2011/0202453 A1 | 8/2011 | Issa | |
| 2011/0213969 A1 | 9/2011 | Nakhjiri | |
| 2011/0214158 A1 | 9/2011 | Pasquero | |
| 2011/0219427 A1 | 9/2011 | Hilo | |
| 2011/0225417 A1 | 9/2011 | Maharajh | |
| 2011/0244919 A1 | 10/2011 | Aller | |
| 2012/0008769 A1 | 1/2012 | Collins | |
| 2012/0084846 A1 | 4/2012 | Weis | |
| 2012/0096277 A1 | 4/2012 | Soria | |
| 2012/0151574 A1* | 6/2012 | Zhang | G06F 21/121 726/19 |
| 2012/0159591 A1 | 6/2012 | Payne | |
| 2012/0160912 A1 | 6/2012 | Laracey | |
| 2012/0203697 A1 | 8/2012 | Morgan | |
| 2012/0221470 A1* | 8/2012 | Lyon | G06Q 20/04 705/44 |
| 2012/0265679 A1 | 10/2012 | Calman | |
| 2013/0031623 A1 | 1/2013 | Sanders | |
| 2013/0068837 A1 | 3/2013 | Dollard | |

OTHER PUBLICATIONS

Gao, Jerry A Wireless Payment System 2005 p. 1-8 IEEE Computer Society.
Kanter, Theo An Open Service Architecture for Adaptive Personal Mobile Communication Dec. 2001 p. 8-17 IEEE Personal Communications.
Hasan, Jahnert Authentication, Authorization, Accounting, and Charging for the Mobile Internet 2001 p. 1-6 Web.
Peirce, Michael Flexible Real-Time Payment Methods for Mobile Communications Dec. 1999 p. 44-55 IEEE Personal Communications.
Herzberg, Amir Payments and Banking With Mobile Personal Devices May 2003 p. 53-58 Communications of the ACM.
Towhidi, Farnaz Knowledge Based Authentication Attacks 2010 p. 1-5 Web.
Tanaka, Michiru A Method and Its Usability for User Authentication by Utilizing a Matrix Code Reader on Mobile Phones 2007 p. 1-12 Springer-Verlag Berlin Heidelberg.
Monijoye, Yves-Alexandre Unique in the Crowd: The Privacy Bounds of Human Mobility Jul. 2005 p. 1-5 Scientific Reports.
Jakobsson, Markus Implicit Authentication for Mobile Devices 2009 p. 1-6 HotSec '09 Proceedings of the 4th USENIX conference on hot topics in security.
Bonneau, Joseph The Quest to Replace Passwords: A Framework for Comparative Evaluation of Web Authentication Schemes May 20, 2012 p. 1-15 SP '12 Proceedings of the 2012 IEEE Symposium on Security and Privacy.

\* cited by examiner

AUTHENTICATION SYSTEM

CROSS-REFERENCE TO RELATED APPLICATIONS

The present Application is a national stage application of International Patent Application PCT/US2014/031247, filed Mar. 19, 2014. International Patent Application PCT/US2014/031247 claims the benefit of U.S. Provisional Application Ser. No. 61/803,319, entitled "Authentication System", filed Mar. 19, 2003; and U.S. Provisional Application Ser. No. 61/821,176, entitled "Authentication System", filed May 8, 2013; and is related to the extent allowed to PCT Patent Application No. PCT/US2013/032040, entitled "Authentication System", filed Mar. 15, 2013; the contents of which are incorporated in this disclosure by reference in their entirety.

BACKGROUND

Identity fraud is the leading type of credit card fraud in the US. Over 9 million adults are victims each year, which results in $100 million in merchant losses. Despite the increased digital power at our disposal, the state of the current security systems available for the prevention of identity fraud is still inadequate.

A problem associated with current security systems is that they lack the ability to truly discern an identity of an individual at the fundamental level.

Accordingly, there is a need for a better security system that is able to truly discern an identity of an individual in order to prevent identity fraud.

SUMMARY

The present invention is directed to systems that satisfy this need. The systems permit improved security for transactions such as transactions on the internet, and in particular provide methods for authenticating a user for performing a transaction. A method having features of the present invention comprises the steps of receiving, on a first authentication server, data representing a unique knowledge of the user. On the same first authentication server, a hardware profile associated with the user is received. On a second authentication server the received data representing unique knowledge of the user is compared with previously stored data representing unique knowledge of the user. On the second authentication server, the received hardware profile is compared with a previously stored hardware profile associated with the user. The transaction is allowed to go forward if both the received data representing the unique knowledge of the user and the received hardware profile are authenticated. Preferably the first and second authentication servers are the same server.

Optional features are:
1. The received data representing unique knowledge is hashed;
2. The received hardware profile is hashed;
3. Transactions only go forward only if comparison of the hardware profiles results in a difference less than a set tolerance.
4. The method can comprise the additional steps of receiving on the first authentication server user information and comparing the received user information with previously stored user information for verification of user, and wherein the transaction goes forward only if the user is verified with the user information.

As detailed below, the hardware profile is based on user generated information on the hardware device and not information that is not so generated such as serial numbers or model type. This provides increased security.

A system for comparing this method comprises an authentication server and memory storing previously stored data representing the unique knowledge of the user and the previously stored hardware profile associated with the user, where the authentication server is programmed to perform the method.

Rather than or in addition to using the unique knowledge of the user, a biometric characteristic of the user such as a fingerprint can be used.

The above described method is described above from the host side of the transaction. A method of authentication of the present invention from the user side comprises receiving on a first electronic device data representing unique knowledge of the user, sending to the authentication server a hardware profile of a second electronic device for authentication to the second electronic device, sending to the authentication server the data representing unique knowledge of the user with the first device, receiving from the authentication server a response indicating that a first device was authenticated and the data representing unique knowledge of the user was authenticated, and proceeding with the transaction if the second device and the data representing the unique knowledge of the user were authenticated. Preferably, the first and second electronic devices are the same device, such as a smart phone.

In one version, the user provides answers to knowledge based questions that only the user can know all the answers to as the unique knowledge. The probability to which the user is identified can also be determined. The user can be required to answer a certain percentage of multiple questions to show the required unique knowledge such as at least 60%.

Preferably, the hardware profile and user information, if used, are salted and hashed before transfer. The salting and hashing can be by individual items or in groups of items. Preferably, salting is done by a three to seven digit random number generator, and hashing is done by SHA-2.

In one version the hash information and hardware profile are truncated to reduce the amount of information transmitted to a server. The truncation can be performed in such a way that sufficient information is retained to differentiate one hardware profile from another hardware profile.

Optionally, where the received hardware profile and the stored hardware profile are different by at least 0.02%, the transaction proceeds only if the received hardware profile and the stored hardware profile match by at least 60%.

The hashing of the hardware profile of the electronic communication device can be with user information stored on the device,

DRAWINGS

These and other features, aspects and advantages of the present invention will become better understood with regard to the following description, appended claims, and accompanying figures where:

DESCRIPTION

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

In the following description, certain terminology is used to describe certain features of one or more embodiments of the invention.

"Transaction" means a communicative action or activity involving two parties or things that reciprocally affect or influence each other. A transaction can be ATM withdrawal or other financial transactions, accessing a file, logging into a website, opening a door to a business or house, starting a car, and being alerted to a washing machine reaching the end of its cycle "Hardware profile" means data that is generated by a user with regard to a hardware device and at least some data specifically associated with and created by the user. As examples, it can be information relating to installed applications, portions of the user's contacts, applications added by the user, music added by the user, and the like.

The term "picture" means a painting, drawing, or photograph of someone or something, the terms "photo" and "photograph" mean a picture or likeness made with a camera, and additionally mean any graphical representation known in the art, such as a hologram, and any type of three-dimensional image. The term "Traitware system" means a proprietary two factor authentication system wherein one factor is a hardware profile of a user's device at least partly based on information on the hardware device resulting from action by the user (as compared to inherent information such as a serial number or model type) and the other factor is user information comprising information about the user, including biometric data. The term "unique knowledge" means information unique or specific to a user such as answers to knowledge based questions (including photoauthentication. The term "photoauthentication" means a technique where a user demonstrates unique knowledge based on identifying one or more pictures and/or manipulating one or more pictures such as swiping the picture in a selected manner.

In general, the present invention provides a method of authenticating a user for performing a transaction comprising the steps of:

(a) receiving on a first authentication server data representing unique knowledge and/or biometric characteristic of the user;

(b) receiving on the authentication server a hardware profile associated with the user;

(c) comparing on a second evaluation server the received data representing unique knowledge of the user with previously stored data representing unique knowledge of the user;

(d) comparing on the second evaluation server the received hardware profile with a previously stored hardware profile associated with the user; and (e) allowing the transaction to go forward if both the received data representing unique knowledge of the user and the received hardware profile are authenticated by steps (c) and (d).

Thus the present invention requires two factor authentication by using (i) a hardware profile and (ii) at least one of unique knowledge of a user and a biometric characteristic of the user. If the unique knowledge of the biometric characteristic are used, there is three factor authentication. Optionally user information can be used, such as in the Traitware system, so that up to four factor authentication is possible. Two-factor authentication is an approach to strong authentication, which requires the presentation of two or more of the two authentication factors: a knowledge factor ("something the user knows"), and a possession factor ("something the user has"). These factors are: 1) Something the user knows, unique knowledge of the user (e.g., password, PIN); 2) something the user has (e.g., ATM card, smart card, hardware token (RSA)); and/or something the user is (e.g., biometric characteristic, such as a fingerprint). A hardware profile is used for what the user has.

The hardware profile includes, but is not limited to information on the hardware device that typically can be affected by the user and selected from the group consisting of (a) contact information, (b) mobile network code, (c) information about music, (d) pixel colors from a background screen, (e) installed applications, (f) arrangement of the applications, (g) frequency of use of applications, (h) location of the user, (i) Bluetooth device pairings, (j) carrier name, (k) mobile country code, (l) phone number, (m) photos, (n) device name, and combinations of one or more thereof. The hardware profile can also include portions of any of the above such as just a portion of the titles of some of the music on the device 100. Contact information includes, but is not limited to, telephone numbers (home, work, and mobile), e-mail addresses (personal and work), addresses (home and work), and names (first, last, middle, and nickname) of contacts stored on the hardware device 100. Information about music includes, but is not limited to, song names, artist names, playlist names, songs in playlists, and duration of songs and playlists. Information about applications includes, but is not limited to, application names, size of applications, and version of applications. Information about photos includes, but is not limited to, photo names, photo locations, and photo sizes.

The unique knowledge comprises (i) a PIN, (ii) a password, (iii) user account number, (iv) at least one picture selected by the user, (v) pictures selected by the user in a desired order, (vi) a swipe pattern on a picture, or (vii) multiple taps on a picture, and more than one of (i)-(vii). The unique knowledge can be a 3-dimensional password that may incorporate user gestures, a known location to be 3-dimensionally scanned, or any other known secret that may be adapted for use in the invention. Preferably the unique knowledge is at least one picture selected by the user.

The user information can comprise the user's (a) name, (b) social security number, (c) national identification number, (d) passport number, (e) IP address, (f) vehicle registration number, (g) vehicle license plate number, (h) driver's license number, (i) credit card information, (j) bank account information, (k) digital identity, (l) date of birth, (m) birthplace, (o) past and current residence, (p) age, (q) gender, (r) marital status, (s) race, (t) names of schools attended, (u) workplace, (v) salary, (w) job position, and combinations of one or more thereof.

The user's name includes, but is not limited to, first, last, middle, and any nicknames, and portions thereof. The user's social security number and IP address include all or part of the number and combinations thereof. The user's national identification number, passport number, vehicle registration number, vehicle license plate number, and driver's license number include letters and symbols, in addition to numbers, and portions thereof. Credit card information includes all or part of the number, expiration date, issuing bank, type (e.g. Visa, MasterCard, Discover, or American Express) and combinations thereof. The user's digital identity includes characteristics and data attributes, such as a username and password for various online accounts (e.g. banking, social media, weblogs, e-mail, etc), online search activities (e.g. electronic transactions), medical history, purchasing history, purchasing behavior. A digital identity can also be linked to an e-mail address, URL, and domain name.

The biometric characteristic can be fingerprint, retina, facial characteristic, and voice data of the user and combinations of one or more thereof. It can also be and EKG waveform and user DNA.

Figure 4:
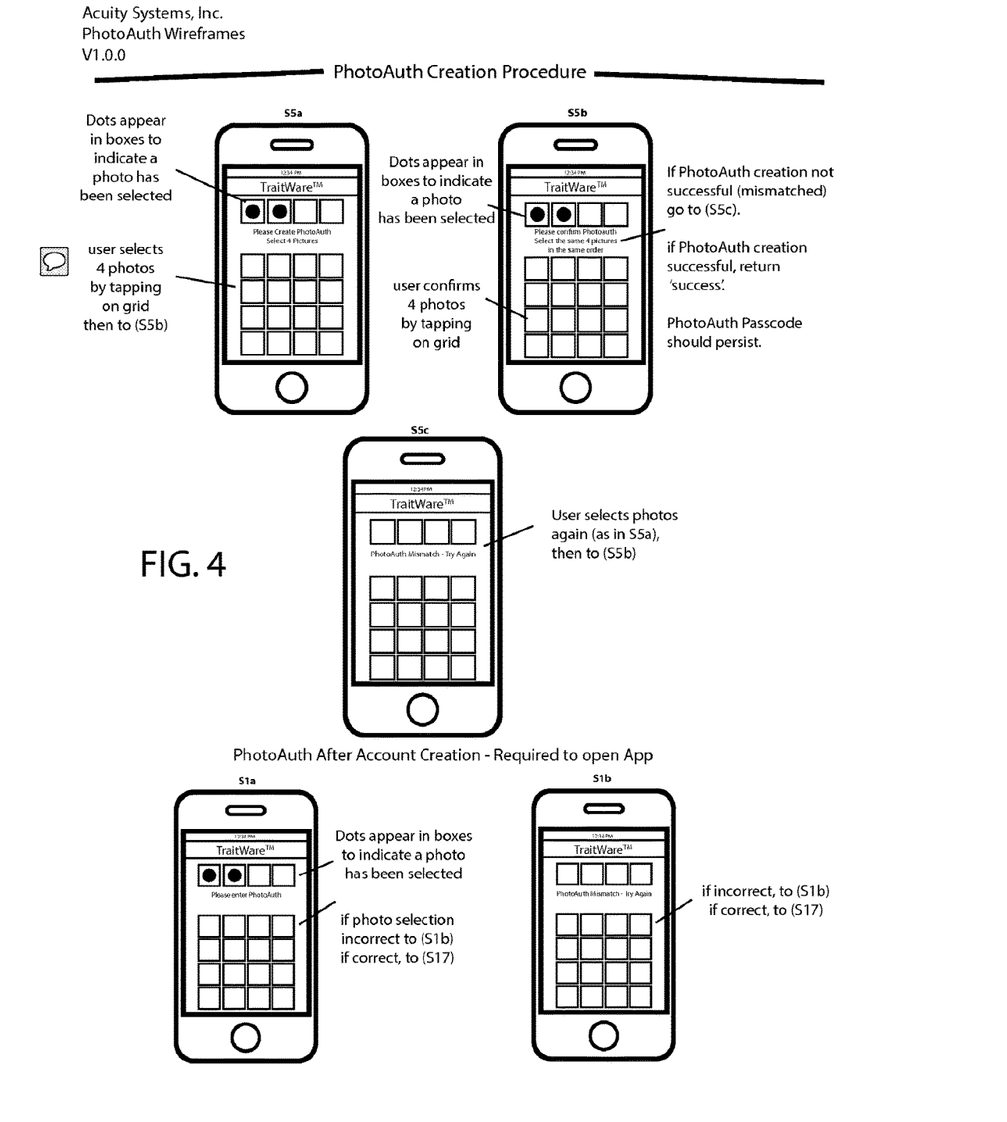
FIG. 4 shows a version of the invention for creating photoauthentication.

The preferred unique knowledge is based on photoauthentication. Referring now to FIG. 4 a process for creating and using photoauthentication is shown. Photoauthentication can be used as an API application on any hardware device, including but not limited to, smartphones, personal computers, and tablet computers on any operating system. Additionally, photoauthentication can be embedded directly into any OS, existing or new.

A user downloads and executes a photoauthentication program on their hardware device and or the device is preloaded with a photoauthentication program. In use the user is presented with a grid of pictures. The user is asked to select at least one picture for authentication. The pictures are arranged in a grid. For example, 16 pictures arranged in a 4×4 grid can be presented, and the user is asked to select 4 of those pictures as their passcode. The number of pictures for the selection grid can be 16, 24, 32, or 48, and the dimensions of the grid can be any possible combination. Preferably, the number is 16 arranged in a 4×4 grid.

The picture grid can be created and animated to scroll from the bottom of the screen, or from side to side, and stop when it's fully visible, which is commonly known in the art such as in the case of the number pad on an APPLE™ IPHONE™.

The pictures can be stock pictures, and the user can choose to auto-populate the grid from the stock photos. Stock pictures can include generic travel locations, landmarks, animals, computer generated figures, people, children or any publically available photo as determined by an authentication server to make the user selection varied and the implementation of photoauthentication more seamless. The stock pictures can be arranged to be different for each time the program is downloaded, so that the stock pictures are different for each hardware device. Additionally, the stock pictures that are not used to populate the grid are discarded. For example, 1000 stock pictures are downloaded with the photoauthentication program, and a random selection is made from the pictures to fill an array of 16, 32, 48, or more pictures as selected by the user. In one embodiment, the array comprises 2,000 pictures. This way, a user is able to select pictures from a very large array of pictures. The size of the array can range greatly depending on various factors, including, but not limited to, the desired level of security and quantity of available pictures. The remaining unused pictures are discarded.

Alternatively, the pictures can be individually selected by the user in the first place or to replace auto-selected pictures. The user can select another source for the pictures such as from a camera roll or other photo storage location. Pictures can be from a cloud server such as ICLOUD™, or any similar cloud server known in the art. Preferably, the user's own pictures are used to create the photo database.

The pictures in the grid can be arranged to always appear in the same order, or to appear in a randomized order each time photoauthentication is executed. If randomized, a random number generator can be used in a formula to determine the arrangement. Preferably, the pictures appear in a randomized order each time. Preferably, the grid pictures are stored to a cloud server.

Photoauthentication makes sure the pictures are different. For example if the user has used face identification the auto select can select pictures with different faces. During the setup the user selects pictures in the selection grid and have an option to edit or select another picture. Selecting another picture first prompts the user to select a storage location or to select to use a camera to take a picture.

Editing a selected picture allows the user to brighten, change contrast, rotate, and apply filters to morph the picture. The user can use the selected picture with different morphing.

After pictures are selected photoauthentication checks that all pictures are different and alerts the user and requires the user to select a different picture for any duplicate pictures. Photoauthentication automatically alerts the user of duplicate pictures by either highlighting or outlining the duplicate pictures.

In one version of the invention, photoauthentication has some features in the default setup that outline the user determined options and the application gives a score for its complexity from weak to strong. Hence, the user is in charge of creating a higher complexity while the application remains user friendly.

Regarding a photoauthentication photo passcode creation procedure, each picture is assigned a number. For example, in the case of a 16×16 grid, each picture is assigned a number from 1 through 16. In one version of the invention, a two digit number or an alphanumeric sequence is used for recognition of each photo to make the passcode more secure. The numbering can be from left to right, starting with the first row, top to bottom, starting with the first column, or any other way. When creating the passcode, the sequence of numbers that corresponds to the selected picture is stored as a single string. For example, if the second, fifth, seventh, and twelfth photos are chosen the string can be stored as 25712. In one version of the invention a symbol such as * is placed in between each identifier, to add more complexity and security to the passcode. A different symbol can be assigned for each space between the passcode or use the same symbol can be used. The following code can be used to implement this:

NSString *inputText=[NSString stringWithFormat: @"%@%@%@%@", strText1, strText2, strText3, strText4];

The stored selection of the pictures is ideally a hash and preferably a salted hash. If the user has named the pictures, information from the picture itself can be used to create the hash.

Preferably information from each picture is stored as well, such as information regarding the locations of the photos, the number of pixels, and the number of color pixels (e.g. R 234 G 100 B 45 taken from six locations of each photo, with the locations being different for each photo). The number of red, blue, and green pixels for each picture can be used in combination with a picture number to create a unique name for each picture. This information can be stored on an authentication server, a cloud server, or the like, or locally on the device. This information can also be used to create a hash that is associated with an individual photo.

The user can select pictures by tapping on the pictures, preferably in a desired order. The number of pictures to be selected can be 4, 5, 6, or any other quantity higher or lower. In one version of the invention four pictures are selected to create a four digit passcode. Preferably at least six pictures are selected. That is because the security greatly increases with a six picture passcode as compared to a four picture passcode.

For four a digit passcode the probability decreases to 1 in 2,000 after four tries while with 16 pictures the probability decreases to only 1 in 13,107 and to 1 in 209,715 with 32 pictures. The 16 picture selection after 4 tries has a higher probability of being the correct selection than for an initial selection for a 4 digit pin based on base 10 digits. Using a database of 32 pictures and selecting 4 has probability slightly greater than using a 6 digit pin.

In one version of the invention, as the user taps on the pictures, each selected picture appears on the screen so the user knows that the intended picture was chosen. The selected pictures can form a separate row when completed. After the last picture is selected, the row of selected pictures disappears and a message is displayed asking the user to repeat the procedure.

In one version of the invention, the selected pictures are highlighted by adjusting the brightness of the picture, or the picture is outlined. In another version of the invention, the selected pictures are shadowed or a large dot appears on the selected picture in order to have the user see which one is selected. A number for each selected photo can appear in this dot to visually show the order of selection which allows more screen area to be used for more images.

In another version of the invention the pictures are stored on the hardware device.

If the photoauthentication is not a correct match, the user is notified that it is invalid. If the authentication is a correct match, the application can transmit the results as unique knowledge for authentication to an authentication server and the user is allowed to proceed with a transaction if the hardware profile is authenticated.

In one version of the invention, the unique knowledge, including photoauthentication data, and/or the hardware profile, can be salted and/or hashed before transmission to the authentication server. In one embodiment, photoauthentication uses multiple taps to further enhance security. The user can add photos from the user's life including family, vacation spots, pets, familiar objects and any other familiar photo can be used as a picture in photoauthentication.

The user then adds to their selection of the number of taps on each of the selected photos which bumps a complexity score which is seen by the user and is based upon a statistical probability running in the background of how secure the passcode is. For example, the number of taps can be given based on order of birth of a family member, one tap for a sister, two taps for a brother, three taps for a mother, and four taps for a father. More than four taps can be used, and each picture can have the same number of taps as another picture. The complexity score can be presented as a sliding mark on a graph shown in the setup screen.

In another embodiment, the user can move (or slide) selected photos to a pre-selected location on the picture grid. This can be used in addition to the tapping feature to add a second level of security. The user first chooses the pictures, adds taps, and then the user slides a selected photo to a pre-selected location. The complexity score can be adjusted accordingly for what is selected by the user.

In one version of the invention, the location for the moved photos can be one of the four corners for the four pre-selected but randomly placed photos (each time the app is opened they are in a different place) which can serve as one default location in the setup. The moved photo can replace the displaced photo currently in that location and the relocated photo can pop up where the moved photo was previously located. These new locations for the photos to be moved can be selected by the user with suggested grids in the app. Additional taps can be made on selected photos by the user on this screen to further enhance security and authentication.

The user selection of each photo can be made with one or more "taps" on the photo to further enhance security which can modify a four PIN code to an eight "tap" PIN very simply and is user friendly. This can be pre-set by the user and a series of four, five or even six photos with one or multiple "taps" can complete the first layer of security for most users. For a higher level of security, the screen can change and modified to be what is described below. A "tap" may be done by a finger on a touchscreen or touchpad, a mouse or any device allowing a user to select a photo.

The moving of the photos can start automatically and can be the second layer of security and can be accomplished by sliding one photo at a time to replace another photo with it automatically going to the vacated spot. This can be done similar to what is accomplished by sliding icons around a smartphone screen, such as an APPLE™ IPHONE™. This is a technique common for smartphone users and cannot be perceived as a difficult task for the user. Regarding the pictures, they can appear on the screen in a similar way as icons on a smartphone screen, such as an APPLE™ IPHONE™. When a picture is moved, picture photo being moved can be like an icon being slid across the screen to a new and predetermined location while the others squish out of the way. The one that is replaced by the one being slid can pop into the empty space vacated by the one that was moved.

Pictures preferably are selected in the same order as during the setup. Pictures can be randomly rotated to make it more difficult for the user to select the correct pictures. As per item one the picture can be in a different order after rotating. Optionally the number of pictures moved is varies on each application opening, which can be one, two, three or more.

A built-in camera can be used to load the pictures of objects, people and/or places as is done in the iPhone for loading an image into a contact file. This can be done in the setup of the photoauthentication and the placement into its grid can be by the appropriate number of each empty space.

In another embodiment, photoauthentication can use converting a picture to sound to allow a user to verify his/her identity by first choosing a picture and then performing a swipe action across it. The picture can be from any source, including but not limited to, a hardware device's memory, an external hard drive, or a cloud server. A technique for sound conversion is taught at www.ohmpie.com. Another technique called audiopaint is taught at http://www.nicolasfournel.com/audiopaint.htm.

In another embodiment the last photo selected enlarges to fill more or all of the screen area on the device allowing for a larger swipe area for the user.

Another option for photoauthentication can be that pictures are not provided to the device unless the device is first authenticated. The pictures can either be cached locally on the device or recalled from a server every time photoauthentication is required. The advantage of not caching the pictures on the device can be that the device is required to authenticate before downloading the pictures. In addition, privileges for an account can be revoked in the case of a stolen device which can result in no pictures being displayed. This can allow an existing account to be reestablished on a new device using the same set of pictures and passcode.

The options for controlling photoauthentication can include:
 1. The number of pictures required for a photoauthentication passcode
 2. The number of screens for displaying the pictures
 3. The number of pictures per screen
 4. Randomized or static display of pictures
 5. Pictures cached on the device or only stored on the server Some examples can be an option for 4, 5, or 6 pictures, a screen displaying a grid of 16, 20, or 24 pictures, and displaying a grid of pictures on 1, 2, or 3 screens.

In one version of the invention, 32 pictures are randomly chosen to be presented in a first 4×4 array. The user selects pictures from the array to be used as a passcode. Afterwards, a second 4×4 array with the same pictures as the first 4×4 array is presented, but with the pictures presented in a different and random order. The user confirms the passcode by selecting the same pictures from the second 4×4 array.

Figure 1:
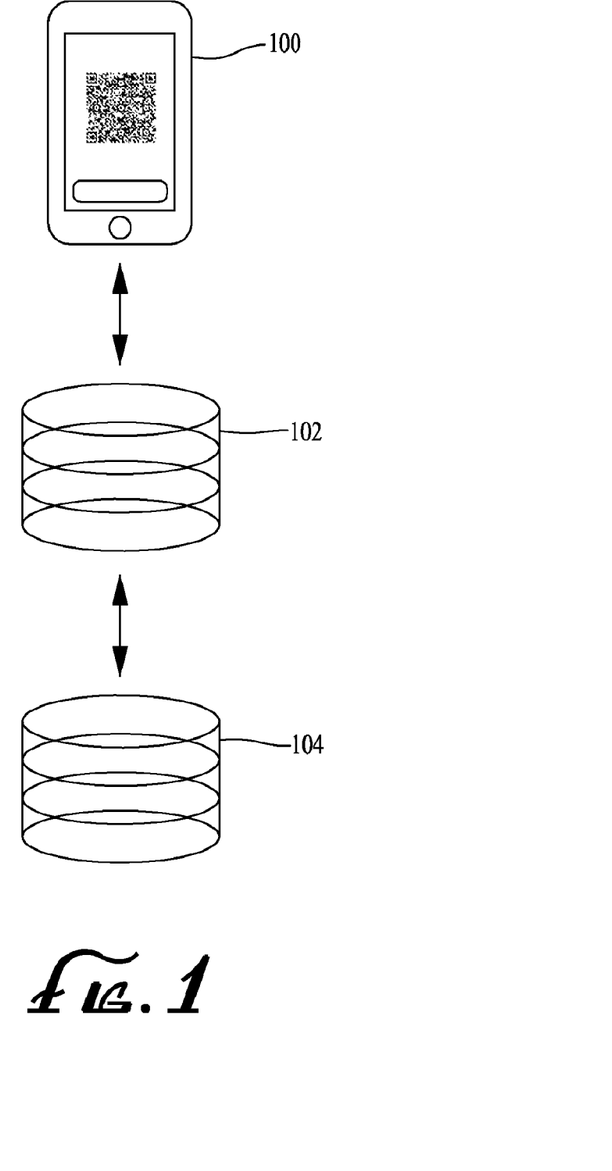
FIG. 1 shows a diagram of a system for creating a combined electronic identification and for allowing a transaction by a user to proceed.

FIG. 1 shows an embodiment of the present invention, depicting a system for allowing a transaction by a user to proceed, comprising a hardware device 100, an authentication server 102, and an optional evaluation server 104. Optionally there can be multiple authentication servers 102.

The hardware device 100 is preferably any device configured with a touchscreen that has the ability to engage in secure wireless communications with various communication networks, such as cellular, satellite and the various forms of Internet connectivity. In one embodiment, the hardware device 100 is capable of capturing biometric input including, but not limited to, fingerprint, facial recognition, voice verification, and vein verification. The hardware device 100 typically comprises a processor, memory, an input interface, and a transmitter, the processor being programmed to process through the input interface user information, data representing unique knowledge of the user and/or biometric characteristics of the user, and a hardware profile of the device, and transmit through the transmitter what is processed to the authentication server 102. The device can include an interface for receiving biometric characteristics such as a fingerprint scanner. The device 100 can also receive through the transmitter authentication from a second server. Once authentication the device 100 is capable to perform a transaction. In one version of the invention, the hardware device 100 is a mobile phone, computer, or tablet computer. The input interface is preferably a touchscreen interface, and the transmitter is preferably a wireless communication module. Preferably there is a single authentication server 102 for authenticating the device 100 and the user, but there can be more than one server.

The server compares for authentication purposes what is memory and what is received from the device 100 to authenticate the user and the device 100. If both are authenticated, a transaction is allowed to proceed.

The authentication server 102 comprises a processor, memory, an input interface, and a connection for receiving information executable by the processor. The memory stores (i) data representing unique knowledge of the user and/or one or more than one biometric characteristic of the user and (ii) a hardware profile of the device 100, and (iii) optionally user information. The processor is programmed to receive through the connection output from the device 100, store in memory the received output, compare the received output against what is stored in memory, and allow a transaction to proceed only if both the device 100 and the user are authenticated.

Optionally a different device than the authenticated device 100 can be used for a transaction. For example, once device 100 such as a smart phone, and the user are authenticated, the system can allow the user to use a different device associated with the user such as a desktop computer. This can be effected by the authentication server 102 sending a code to the device 100 which can be used on the desktop computer for signing in.

Preferably the authentication server 102 is an infrastructure as a service (IaaS) provider that includes at least two 64-bit high-CPU medium Amazon Elastic Compute Cloud (EC2) server instances to be used for active Mongo database hosts, which are connected to a load balancer, which is in turn connected to the client. Preferably, the authentication server 102 also includes 16 Elastic Block Store (EBS) volumes to be used in two redundant arrays of independent disks (RAID) 10 arrays to support active Mongo database servers, and one 64-bit micro instance to be used for Mongo Arbiter role.

Preferably, the evaluation server 104 can be associated with any third party authentication authority such as a credit information agency, such as, but not limited to, Experian.

Thus the present invention requires and allows for two factor authentication by using (i) a hardware profile of a device associated with the user, and (ii) at least one of unique knowledge of the user and a biometric characteristic of the user, and (ii) optionally user information which can allow for authentication for Traitware system purposes.

Figure 2A:
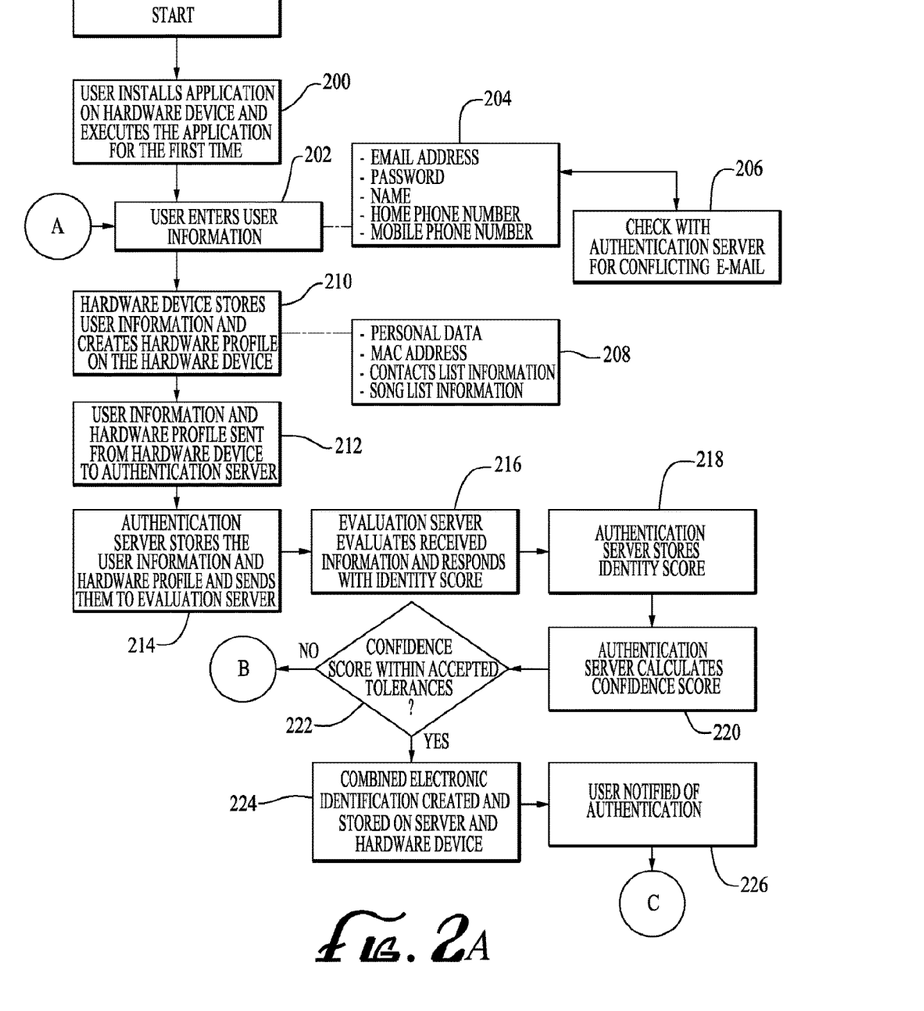
FIG. 2A shows a flow diagram that illustrates the process of creating a combined electronic identification from both the user side and the server side.
Figure 2B:
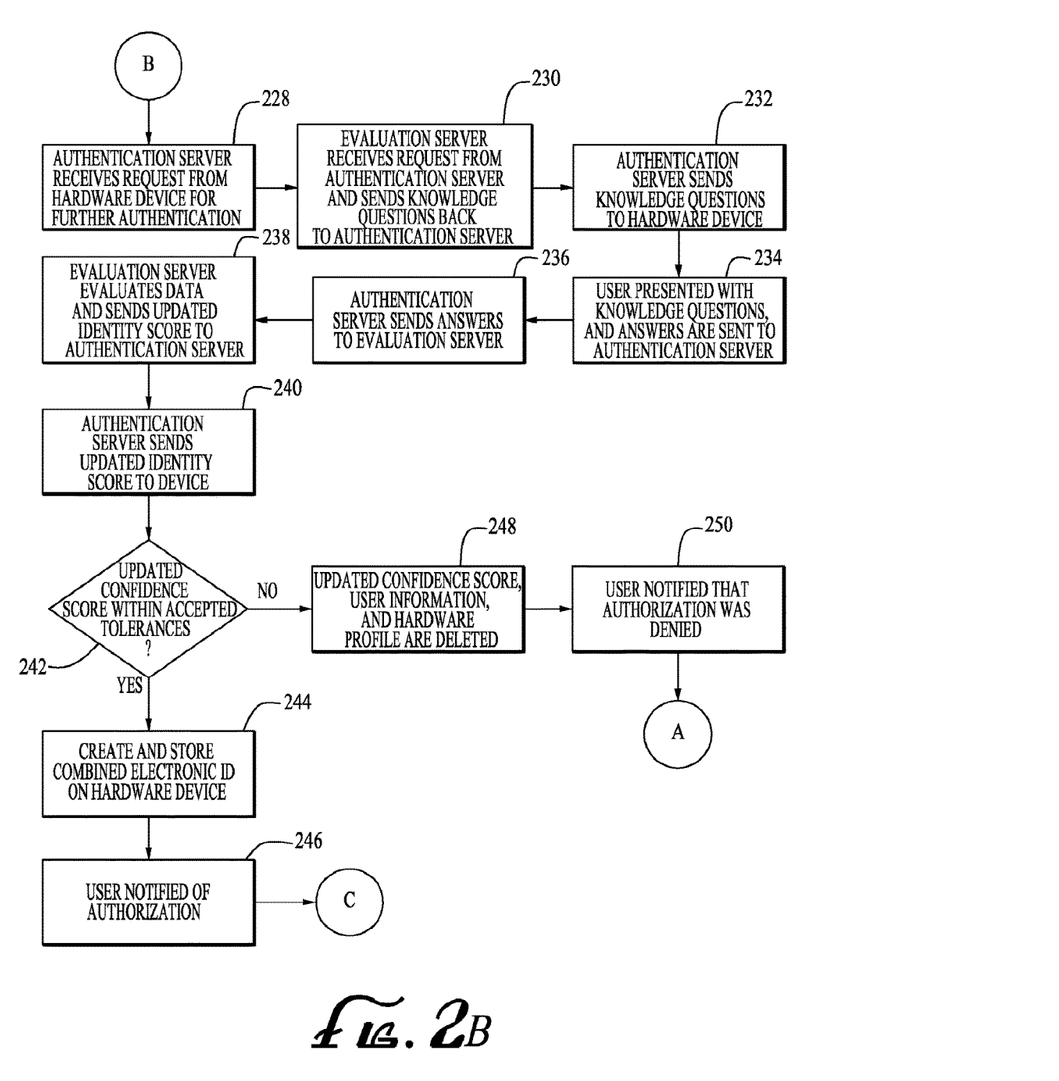
FIG. 2B shows a flow diagram that illustrates the process of creating a combined electronic identification from both the user side and the server side.

Referring now to FIGS. 2A and 2B, an embodiment of the present invention allows use of Traitware system, where a combined electronic identification associated with the hardware device 100 is created. A user first installs 200 an application onto the hardware device 100 and executes the application. Although the application is described with regard to FIGS. 2A and 2B for creating a Traitware system electronic identification and authentication using Traitware system, the same application and system can be used for unique knowledge based and/or biometric characteristic based authentication. The application 200 is a program that is downloaded and installed onto the hardware device 100 or can be installed on the device 100 as provided to the user, and is used to create the combined electronic identification of Traitware system. The application obtains user information about the user of the device 100 by prompting the user to input user information 202, 204 which has noted can be unique knowledge and/or biometric characteristic information 204 about the user on the device. The user information can be automatically gathered by the application if it is already stored in the hardware device. A conflict check 206 for an enter e-mail address can be performed with the authentication server. The hardware device 100 stores 208, 210 user information and creates a hardware profile on the hardware device.

The hardware device 100 then sends 212 data which includes the hardware profile, and at least one of the unique knowledge and biometric characteristic, and optionally the user information from the device 100 to the authentication server 102. The authentication server can create a combined electronic identification of the user information and the hardware profile 208 comprising user generated data stored on the device 100. The authentication server can store 214 the sent data and passes the sent data to the server 102. In order to evaluate user information, the evaluation server 104 evaluates 216 the information and responds with an identity score and stores 218 the identity score, which is based on the evaluation of the user provided information 21. The hardware device 10 receives the authentication from the server. In the case the evaluation server 104 is associated with Experian, a Precise ID (PID) score is received. In one case the identity score is a numerical representation (from 0 to 1000) of the likelihood the user is a fraud. The closer the identity score is to 1000, the less likely the user is a fraud. Preferably, the matter proceeds only if the identity score is over 660.

The authentication server uses the identity score 218 to create 220 a confidence score, which is also stored on the authentication server 104. The confidence score is calculated using the identity score and the user information 220. The confidence score is a numerical representation of the likelihood the user is a fraud. It is determined 222 If the confidence score is within accepted tolerances 222, and if so, the user information and the hardware profile are linked together to create the Traitware system combined electronic identification that is stored 224 on the hardware device and authentication server. The accepted tolerances are set according to the requirements of the transactions. For example, for lower value transactions the probability that it is an authenticated user may be set at 80%. For higher value transactions the probability that it is an authenticated user may be set at 99.999999%. Preferably, linking is done by concatenating the user information and the hardware profile. The user is then notified of the authentication and creation of the combined electronic identification 226.

In one version of the invention at least one of the user information and the hardware profile are salted and/or hashed prior to linking Alternatively, both the user information 202 and hardware profile 208 are salted and hashed prior to linking The biometric characteristic and/or unique knowledge likewise can be salted and/or hased. Preferably, salting is done by a three to seven digit random number generator, and hashing is done by Secure Hash Algorithm-2 (SHA-2). The hash can be four digits of a 64 bit string. Preferably, salting and hashing occur before transfer to any external device. The salting and hashing can be by individual items or in groups of items. In one version the hash is truncated to reduce the amount of information transmitted to a server. The truncation can be performed in such a way that sufficient information is retained to differentiate one user from another user.

In one version of the invention, if the confidence score is not within the accepted tolerances, a request 228 is sent by the hardware device to the authentication server that further authentication is needed, and the authentication server receives the request. The authentication server then sends the request to the evaluation server 104, the evaluation server receives 230 the request, and the evaluation server sends knowledge based questions (KBQ) to the authentication server, which sends 232 the KBQ's to the hardware device. The knowledge questions are commonly used by credit agencies to verify a user's identity, and are commonly known in the art, e.g., "What was the color of your first car?" Preferably, the knowledge questions are sent in extensible markup language (XML) format. The user is presented 234 with the knowledge questions, the user provides answers to the knowledge questions, and the answers are sent 236 back to the evaluation server via the authentication server. The evaluation server evaluates 238 the answers and sends an updated identity score to the authentication server, which is then sent 240 to the device. An updated confidence score is calculated using the updated identity score and the user information. If the updated confidence score is within accepted tolerances 242, the user information and the hardware profile are linked to create the combined electronic identification, which is stored 244 on the hardware device, and the user is notified 246 of the result. The accepted tolerances are set according to the requirements of the transactions. For example, for lower value transactions the probability that it is an authenticated user may be set at 80%. For higher value transactions the probability that it is an authenticated user may be set at 99.999999%. If the confidence score is not within accepted tolerances, the updated confidence score, user information, and hardware profile are deleted 248 and the user is notified 250 that the authentication was denied.

Preferably, the confidence score determines the types of transactions that are available to the user, which includes consideration of the method by which the user was authenticated to create the combined electronic identification. For example, whether the user answered KBQ's.

In one version of the invention, once the combined electronic identification is created, no personal identifying factors are retained or only a selected set is retained on the hardware device, such as the user's name and address.

Alternatively, instead of using an evaluation server 104, the user's identity can be verified by authenticating the user information against a private database or directory, including but not limited to, Lightweight Directory Access Protocol (LDAP) or Active Directory, as commonly known in the art. In another version of the invention, the user's identity can be verified by sending a one-time password to the user via voice call, SMS message, or e-mail, which is commonly known in the art.

Preferably, the above-described method is accomplished by executing the following algorithm:

I. User Information
  1) Concatenate provided e-mail (SHA-2) and MAC address (SHA-2) and store. Include the salt: (SHA-2/123e-mailAddressSHA-2/321MACaddress). Salt is the extra digits appended to e-mail and MAC (123,321).

II. Generate Confidence Score
  1) User Activity
    a) Did user perform an activity that enhances the confidence that they are the actual user of the device, such as selecting information already stored on the hardware device or whether the user is at a normal location consistent with their activities?
      i) If yes, set variable DPID to 90%
      ii) If no, set variable DPID to 70%
  2) Receive KBQ identity score from evaluation server.
    a) If KBQ identity score is over 66, allow creation of combined electronic identification.
    b) If KBQ identity score is below 66, deny creation of combined electronic identification.
  3) Calculate confidence score. Confidence score is stored on authentication server, never passed to hardware device.
    a) Confidence Score =(PID from Experian * DPID) * (0.01*KBQ identity score)
    b) Example: (630*0.9)*(0.01*73) =413, where for purposes of this example 630 is a generic PID that is representative of the type of score that can be provided.

III. Hardware Profile
  1) Initial and Subsequent State Characteristics
    a) Device Characteristics
      i) Device name (*name)
      ii) Carrier name (*carrierName)
      iii) Mobile Country Code (*mcc)
      iv) Mobile Network Code (*mnc)
    b) Device Personality
      i) Contacts using full name.
      ii) Songs using full song names.
      iii) Application names.
      iv) Bluetooth device parings. (go over testing methods with Charles)
      v) Photo names (as stored on device)
      vi) Photo locations
  2) Traitware systemID (TWID-Initial State)—Items sent to MongoDB With the following items, create salted hashes with dynamic salt on the device and send to the server. In addition, store the salt independently on the device. Use a random five digit number for the salt.
  a) Initial Database of Contacts (Full Name)
  b) Initial Database of Song Titles (Use full titles)
  c) Initial Database of Apps (App name)
  d) Bluetooth Device Pairings
  e) Device name (*name)
  f) Carrier name (*carrierName)
  g) Mobile Country Code (*mcc)
  h) Mobile Network Code (*mnc)

Figure 3A:
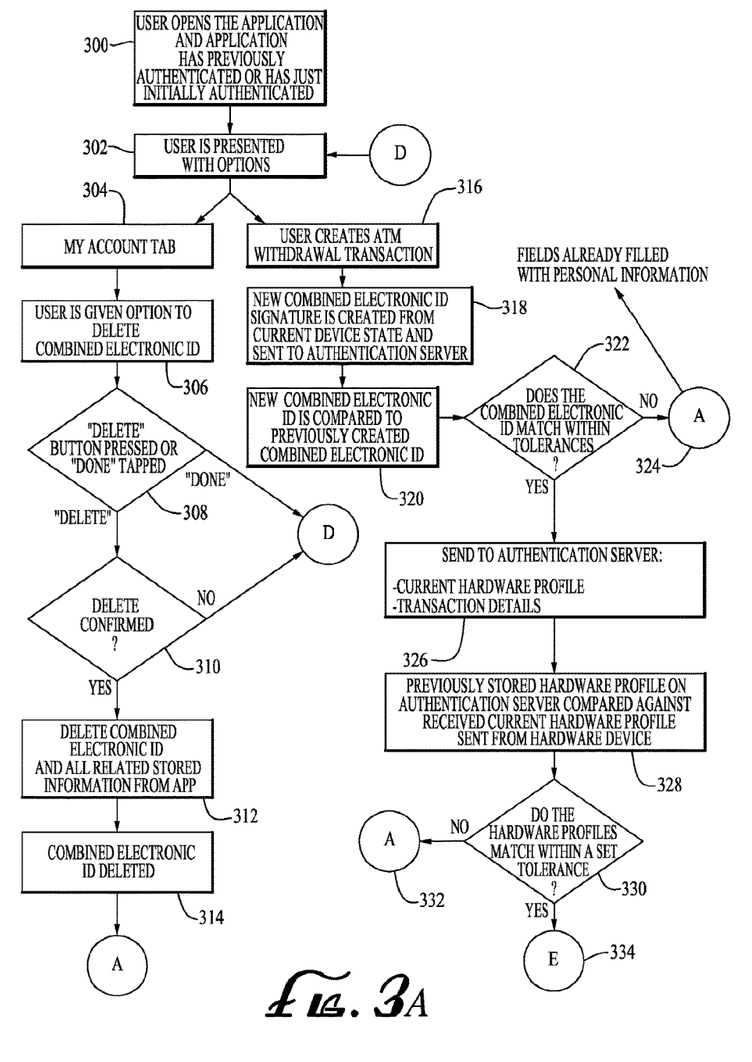
FIG. 3A shows a flow diagram that illustrates the process of allowing a transaction by a user to proceed from both the user side and the server side.
Figure 3B:
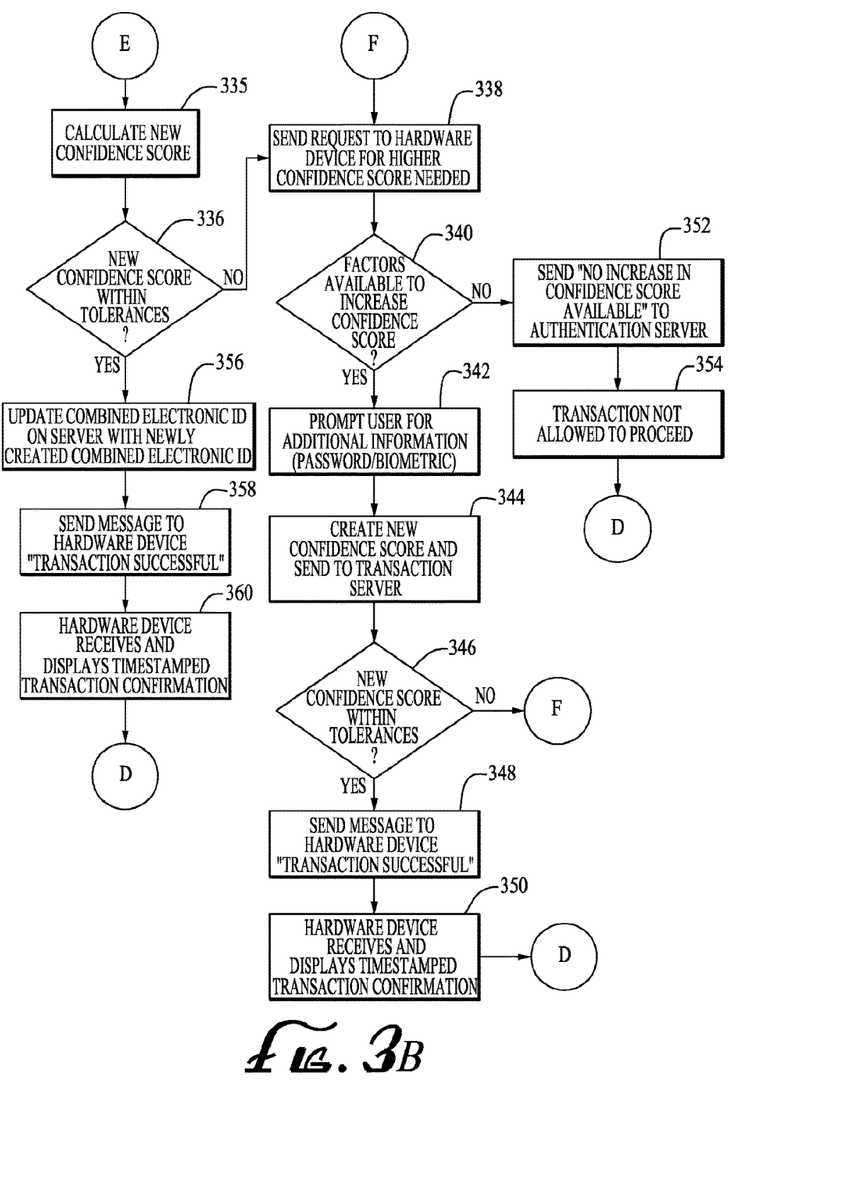
FIG. 3B shows a flow diagram that illustrates the process of allowing a transaction by a user to proceed from both the user side and the server side.

Referring now to FIGS. 3A and 3B, depicts an embodiment of the invention for a method of allowing a transaction by a user utilizing a stored electronic identification, the stored electronic identification comprising a first stored hardware profile and optionally stored user information, and at least one of a biometric characteristic (not shown in the drawing) and data representing unique knowledge of the user (not shown in the drawing). If a received hardware profile and the stored hardware profile are different by at least 0.02%, the transaction proceed only if (i) the received hardware profile and the stored hardware profile match by at least 60% and (ii) the received user information and the stored user information match by at least 30%, or received biometric characteristic and stored biometric characteristic match by at least 80%, or received unique knowledge and stored unique knowledge match by at least 60%. This embodiment utilizes the authentication server 102 programmed for performing the method and memory storing the stored information.

First the user opens the application after being authenticated and having a combined electronic identification created by the steps described above 300. The user is then presented with an option to either delete the combined electronic identification 302-312, or to initiate a transaction 316. In the figures, the transaction depicted is an ATM withdrawal.

If the user chooses to initiate a transaction, the hardware device's current hardware profile and at least one of biometric characteristic and data representing user's unique knowledge are used. If user information is used it can be used to create a new combined electronic identification on the hardware device 100, and the new combined electronic identification along with at least one of biometric characteristic and data representing user's unique knowledge is sent to an authentication server 318 (collectively referred to as "sent data"). The authentication server then compares the sent data with stored previously sent data. If they do not match 322, the transaction does not proceed 324. If they match within a set tolerance, the current hardware profile and transaction details are sent to an authentication server 326. In one embodiment, the set tolerance is between 0.02% and 76%.

The steps of sending a combined electronic identification and the hardware profile are preferably sent at the same time to an authentication server. 322 preferably does not take place, but 330 is the preferable step to compare both unique knowledge (user information) and the hardware profile with previously stored user information and a hardware profile.

The authentication server then compares the received current hardware profile to a previously stored hardware profile 328. This is accomplished by calculating the percentage difference of the previously stored hardware profile with the received current hardware profile. If the percentage difference is not within a set tolerance 330, the transaction does not proceed 332. In one embodiment, the set tolerance for the hardware profile is between 0.02% and 76%. If the current hardware profile matches the previously stored hardware profile within the set tolerance, the transaction is allowed to proceed 334. Alternatively, the sent data are sent together for evaluation by the authentication server at the same time. Preferably the percentage difference between the current user information and a previously stored user information is also between 0.02% and 76%.

Preferably the transaction is allowed to proceed only if the current hardware profile and the previously stored hardware profile are different by at least a factor which is a function of the time since the last transaction. For example, a transaction may not be allowed to proceed unless there is a 0.02% change in the hardware profile, which can represent a change in one of the user's characteristics after a week.

In one version of the invention, the transaction is not allowed to proceed if the received hardware profile and the stored hardware profile are identical, which can indicate a copied profile.

A new confidence score is generated by using the previously stored sent data and the currently received sent data, the confidence score calculated based on the percent differences, and the previously calculated confidence score 335. The new confidence score is a numerical representation between 0 and 1 of the probability that the user is a fraud.

In one version multiple user hardware profiles are obtained for user information data and the percent differences between user hardware profiles are computed. The differences are used to create statistical distributions which can be used to create statistical probabilities by which a user data or information differs from another user and which can be used to determine that a device to which a user has been assigned is statistically different from another user. This information can be used to determine that a particular device belongs to a particular user.

In one version of the invention, the percent differences between user hardware profiles are computed using the Levenshtein Distance equation, which defines the distance between two strings is given by where:

$$lev_{a,b}(i,j) = \begin{cases} \max(i,j), & \min(i,j) = 0 \\ \min \begin{cases} lev_{a,b}(i-1,j)+1 \\ lev_{a,b}(i,j-1)+1 \\ lev_{a,b}(i-1,j-1)+1[a_i \neq b_j] \end{cases}, & \text{else} \end{cases}$$

The new confidence score is checked to determine if it is within a set tolerance 336. Preferably, the set tolerance is 99.999999%, so that the transaction proceeds only if the new confidence score is over 99.999999%. If it is not, then additional steps are taken to increase the new confidence score, such as prompting the user for a password or biometric authentication 338-350. If the confidence score is unable to be increased, the transaction is not allowed to proceed 352, 354.

If the new confidence score is within the set tolerance, the new stored sent data replaces the previously stored data on the authentication server and the transaction is allowed to be completed 356-360.

In another version of the invention, the transaction is allowed to proceed only if the received hardware profile and the stored hardware profile match by at least 40%. Alternatively, the transaction is allowed to proceed only if the received hardware profile and the stored hardware profile match by at least 50%. In another version the transaction is allowed to proceed only if the received hardware profile and the stored hardware profile are different by at least 1%.

The present invention has the following features and advantages:

1. A stand-alone, easy-to-use secure log in for mobile and other devices that replaces passwords or PIN's;
2. A basic level of photoauthentication is 6 times greater than a standard PIN, and can be upgraded to 1/12.5 billion and even higher with features that are user-selected;
3. A versatile, single, integrated solution that does not require additional hardware;
4. When working with the Traitware system system, the device is tightly bound to the individual and the actual use of the device is securely authorized for the registered user
5. A secure solution providing better security than other access technology;
6. A less cumbersome process of authentication for the user than other security systems;
7. The user can provide answers to knowledge-based questions that only the user can know all the answers to. The probability to which the user is identified can also be determined.

In another version of the invention at least one of the user information and the hardware profile are salted and hashed prior to linking to create a combined electronic identification. Alternatively, both the user information and the hardware profile are salted and hashed prior to linking.

The alternative to user created photographs are stock images and the user can choose to auto-populate the grid from the stock photos. Stock pictures can include generic travel locations, landmarks, animals, computer generated figures, people, children or any publically available photo as determined by an authentication server to make the user selection varied and the implementation of photoauthentication more seamless.

The pictures can be arranged to be different for each time the program is downloaded, so that the pictures are optimized for each hardware device. Additionally, the stock pictures that are not used to populate the grid are discarded.

For heightened security the pictures appear in a randomized order each time. From a security stand point random is preferred since touch marks on the screen cannot provide any useful information.

Finally, the user verifies the selections a second time by going through the same procedure as the first time. If the second selection of pictures matches the first, the picture passcode has been successfully created. If the second selection of pictures does not match the first, the process starts over from the beginning, and a message is displayed informing the user of a mismatch in the passcode and to try again.

When the passcode is successfully created, photoauthentication stores the passcode and notifies the user of the creation of the passcode.

To use the photoauthentication passcode, the user is first presented with a grid containing the same pictures previously selected by the user. The user selects the correct pictures in the correct order. If the photoauthentication is not a correct match, the user is notified that it is invalid. If there is a correct match, the application authenticates the user, and the user is allowed to proceed. The user is limited to four attempts to select the correct combination.

In one version of the invention, there is a procedure for resetting the initial picture selection to a new set to be available when user is signed on with photoauthentication. Warning is given to the user that new picture selection is now active on the next sign on.

Photoauthentication allows a user to authenticate simply and securely by providing a known secret that is difficult to guess or spoof. Once a user has chosen their photoauthentication sequence this sequence may then in turn be used to authenticate the user through credential regeneration of a photoauthentication key, a public/private key pair, and random salt used for salting device characteristics representative of the user. These credentials are used to authenticate the user through an authentication server, which then issues a sessionId, or Identity Binding Token (IBT) allowing a user to access trusted resources. A relying party or a third party identity provider can control the authentication server.

To explain further, once the user enters the correct photoauthentication sequence, algorithms in the software use the information from that sequence to generate a Photoauthentication hash. The photoauthentication hash is then used to create three distinct elements for the authentication of the device:

1. Photoauthentication Key. The hash is used to create a key that is checked against a previously stored key on the server. This verifies that the correct photoauthentication sequence was entered on the device.

2. The device profile is salted using information contained in the photoauthentication hash. This verifies that the device profile came from a device whose photoauthentication key was known to the individual authenticating. It also prevents someone who attempts to spoof a photoauthentication key authentication without having the device profile.

3. A Traitware system Key Seed. This is a value that is generated by the device app and used to regenerate a Traitware system key pair. The key pair is used to sign and verify the payload of the Traitware system contents.

The photoauthentication hash is used to create all three elements, and without knowing the correct photoauthentication sequence, the device cannot be authenticated. One advantage of this method lies in separation of elements used to authenticate. If a hacker hacks the app, the algorithms discovered that are used to generate the various elements are not enough to spoof authentication. The photoauthentication sequence is used to generate the photoauthentication hash used to feed into those algorithms to get the outputs. Limits on authentication attempts in the event of a brute force attack are created on the server. Likewise, in the event of a data breach on the authentication server database side, the information stored in a user account is not enough to allow for authentication, as the private key used to sign a payload is regenerated on the device for every authentication attempt using the photoauthentication sequence.

Separating the elements used for authentication and having a correct photoauthentication sequence to be entered prevents nearly all of the most common authentication hacks.

Although the present invention has been discussed in considerable detail with reference to certain preferred embodiments, other embodiments are possible. Therefore, the scope of the appended claims should not be limited to the description of preferred embodiments contained in this disclosure.

All the features disclosed in this specification (including any accompanying claims, abstract, and drawings) can be replaced by alternative features serving the same, equivalent or similar purpose, unless each feature disclosed is one example only of a generic series of equivalent or similar features.

What is claimed is:

1. A method of authenticating a user for performing a transaction comprising the steps of:
   (a) receiving on a first authentication server data representing unique knowledge of the user, wherein data representing unique knowledge of the user is related to a sequential selection of pictures presented to the user;
   (b) receiving on the authentication server a hardware profile, the hardware profile being associated with the user;
   (c) comparing on a second evaluation server the received data representing unique knowledge of the user with previously stored data representing unique knowledge of the user;
   (d) comparing on the second evaluation server the received hardware profile with a previously stored hardware profile associated with the user by calculating a percent difference of the previously stored hardware profile with the received current hardware profile using the Levenshtein Distance equation;
   (e) allowing the transaction to go forward if both the received data representing unique knowledge of the user is authenticated by step (c) and the difference between the received hardware profile and the previously stored hardware profile from the result of step (d) is less than a set tolerance; and
   (f) if the percentage difference is not within the set tolerance, the transaction does not proceed.

2. The method of claim 1 wherein the first and second authentication servers are the same server.

3. The method of claim 1 wherein the data representing unique knowledge of the user is generated based on a sequence of the sequential selection of the pictures and information from each picture of the sequential selection of pictures.

4. The method of claim 1 further comprising (i) receiving on the first authentication server user information and (ii) comparing the received user information with previously stored user information for verification of the user on the evaluation server; and
   wherein step (e) comprises allowing the transaction to go forward only if the user is verified in step (ii).

5. The method of claim 1 wherein the set tolerance is between 0.02% and 76%.

6. The method of claim 1 wherein the set tolerance is determined based on the percent differences between multiple user hardware profiles and an associated statistical distribution of the percent differences of the multiple user hardware profiles indicating a statistical probability that one hardware profile is different from another hardware profile above a confidence threshold.

7. The method of claim 1 wherein the unique knowledge is a known location to be 3-dimensionally scanned.

8. The method of claim 1 wherein the unique knowledge is a 3-dimensional password that incorporates user gestures.

9. The method of claim 3 wherein the information from each picture is related to a pixel color.

10. The method of claim 4 wherein the user information comprises the user's (a) name, (b) social security number, (c) national identification number, (d) passport number, (e) IP address, (f) vehicle registration number, (g) vehicle license plate number, (h) driver's license number, (i) appearance, (j) fingerprint, (k) handwriting, (l) credit card information, (m) bank account information, (n) digital identity, (o) date of birth, (p) birthplace, (q) past and current residence, (r) age, (s) gender, (t) marital status, (u) race, (v) names of schools attended, (w) workplace, (x) salary, (y) job position, (z) biometric data, and combinations of one or more thereof.

11. The method of claim 6 wherein the hardware profile corresponds to a second electronic device and the user information or the data representing unique knowledge of the user is received at the authentication service from a first electronic device, separate from the second electronic device.

12. The method of claim 9 further comprising presenting to the user a grid of available pictures from which the user makes the sequential selection.

13. The method of claim 10 wherein the hardware profile comprises information on a hardware device selected from the group consisting of (a) contact information, (b) mobile network code, (c) information about music, (d) pixel colors from a background screen, (e) installed applications, (f) arrangement of installed applications, (g) frequency of use of applications, (h) location of the user, (i) Bluetooth device pairings, (j) carrier name, (k) mobile country code, (l) phone number, (m) photos, (n) device name, and combinations of one or more thereof.

14. The method of claim 11 wherein the hardware profile is received at the authentication service from the second electronic device and not through the first electronic device.

15. The method of claim 12 further comprising randomly generating a location of each available picture to display to the user such that the user encounters a different arrangement of available pictures on sequential attempts to enter a sequential selection.

16. The method of claim 13 comprises performing the transaction.

17. The method of claim 15 wherein the received data representing unique knowledge is hashed.

18. The method of claim 16 wherein at least one of the available pictures is supplied by the user.

19. A method for a user to perform a transaction comprising the steps of:
  (a) receiving on a first electronic device data representing unique knowledge of the user, wherein data representing unique knowledge of the user is related to a sequential selection of pictures presented to the user;
  (b) sending to an authentication server a hardware profile of a second electronic device for authentication of the second electronic device;
  (c) sending to an authentication server the data representing unique knowledge of the user with the first device;
  (d) receiving from the authentication server a response indicating whether the first device was authenticated and the data representing unique knowledge of the user was authenticated;
  (e) proceeding with the transaction if the second device and the data representing unique knowledge of the user were authenticated and only if a difference between the hardware profile of a second electronic device sent to the authentication server at step b and a previously stored hardware profile is less than a set tolerance and the difference between the hardware profile and the previously stored hardware profile is performed by calculating a percent difference of the previously stored hardware profile with the hardware profile using the Levenshtein Distance equation; and
  (f) if the percentage difference is not within the set tolerance, the transaction does not proceed.

20. The method of claim 19 wherein the first and second electronic devices are different devices.

21. The method of claim 19 the data representing unique knowledge of the user is generated based on a sequence of the sequential selection of the pictures and information from each picture of the sequential selection of pictures.

22. The method of claim 19 wherein the information from each picture is related to a pixel color.

23. The method of claim 19 wherein the set tolerance is between 0.02% and 76%.

24. The method of claim 19 wherein the set tolerance is determined based on the percent differences between multiple user hardware profiles and an associated statistical distribution of the percent differences of the multiple user hardware profiles indicating a statistical probability that one hardware profile is different from another hardware profile above a confidence threshold.

* * * * *